United States Patent
Doyle

(10) Patent No.: US 10,263,231 B2
(45) Date of Patent: Apr. 16, 2019

(54) BATTERY COVER ASSEMBLY

(71) Applicant: Doyle Manufacturing, Inc., Holland, OH (US)

(72) Inventor: Michael A. Doyle, Holland, OH (US)

(73) Assignee: DOYLE MANUFACTURING, INC., Holland, OH (US)

( * ) Notice: Subject to any disclaimer, the term of this patent is extended or adjusted under 35 U.S.C. 154(b) by 268 days.

(21) Appl. No.: 15/258,479

(22) Filed: Sep. 7, 2016

(65) Prior Publication Data

US 2016/0380249 A1   Dec. 29, 2016

Related U.S. Application Data

(62) Division of application No. 13/557,743, filed on Jul. 25, 2012, now Pat. No. 9,461,287.

(60) Provisional application No. 61/513,884, filed on Aug. 1, 2011.

(51) Int. Cl.
*H01M 2/12* (2006.01)
*H01M 2/04* (2006.01)

(52) U.S. Cl.
CPC ....... *H01M 2/1205* (2013.01); *H01M 2/1252* (2013.01)

(58) Field of Classification Search
None
See application file for complete search history.

(56) References Cited

U.S. PATENT DOCUMENTS

| | | |
|---|---|---|
| 1,010,695 A | 12/1911 | Sloan |
| 1,459,121 A | 6/1923 | Van De Wiel |
| 1,469,119 A | 9/1923 | Stallings |
| 2,570,123 A | 10/1951 | Heine |
| 3,038,954 A | 6/1962 | Pattison et al. |
| 3,392,060 A | 7/1968 | Favre |
| 3,907,605 A | 9/1975 | Melone |
| 3,915,752 A | 10/1975 | Gross |
| 3,992,226 A | 11/1976 | Godshalk |
| 4,113,925 A | 9/1978 | Kohler et al. |
| 4,186,247 A | 1/1980 | Mocas |
| 4,233,370 A | 11/1980 | Heiser et al. |
| 4,317,868 A | 3/1982 | Spiegelberg |
| 4,477,542 A | 10/1984 | Braswell |
| 4,689,281 A | 8/1987 | Dandona et al. |
| 5,108,853 A | 4/1992 | Feres |
| 5,284,720 A | 2/1994 | Thuerk et al. |
| 5,525,438 A * | 6/1996 | Kostrivas ............ H01M 2/1211 429/121 |
| 5,981,099 A | 11/1999 | Bourbeau |
| 6,432,573 B1 | 8/2002 | Oschmann |
| 6,554,025 B1 | 4/2003 | Fitter |
| 6,746,795 B2 | 6/2004 | Schwarz |

(Continued)

*Primary Examiner* — Daniel S Gatewood
(74) *Attorney, Agent, or Firm* — Shumaker, Loop & Kendrick, LLP; James D. Miller

(57) ABSTRACT

A vent cap gang includes a plurality of vent caps to be received in respective vent ports formed in a battery cover. Each of the vent caps includes a cylindrical body having first pin located at an axial center thereof and a second pin offset from the axial center. A plurality of elongate members is operably coupled to each of the vent caps by the first and second pins. An actuator is operably coupled to the elongate members and at least one of the vent caps to cause simultaneous rotational movement of the vent caps.

20 Claims, 6 Drawing Sheets

(56) References Cited

U.S. PATENT DOCUMENTS

| | | | |
|---|---|---|---|
| 2004/0013936 A1* | 1/2004 | Barrett, Jr. | .......... H01M 2/1252 429/71 |
| 2006/0141342 A1 | 6/2006 | Marconi et al. | |
| 2007/0031714 A1 | 2/2007 | Huang | |
| 2010/0323229 A1 | 12/2010 | Campau | |
| 2013/0034759 A1 | 2/2013 | Doyle | |

* cited by examiner

BATTERY COVER ASSEMBLY

CROSS-REFERENCE TO RELATED APPLICATION

This patent application is a divisional patent application of U.S. patent application Ser. No. 13/557,743 filed Jul. 25, 2012 which claims the benefit of U.S. Provisional Pat. Appl. Ser. No. 61/513,884 filed Aug. 1, 2011, the entire disclosures of which are hereby incorporated herein by reference.

FIELD OF THE INVENTION

The invention relates to batteries, and more particularly to a battery cover assembly including a vent cap gang which is easily installed and removed.

BACKGROUND OF THE INVENTION

Many devices use a quarter-turn or bayonet-style attachment in applications where quick installation and removal are desired. For example, lead-acid batteries use this method of attachment for securing the vent caps within the vent ports. The same attachment method is often used in the manufacture of battery watering systems to mount the watering valves to the vent ports.

A typical prior art battery cover assembly for a battery includes a battery vent cap and a battery cover having a vent port. The vent cap and the vent port each include a pair of diametrically opposed bayonet tabs. The tabs have substantially similar lead angles. The individual vent cap is manually tightened within the vent port as the vent cap is rotated 90 degrees clockwise (quarter-turn method} by field personnel. This tightening secures the vent cap and provides a seal between a flange of the vent cap and a rim of the vent port. The seal prevents a migration of battery acid out of the battery. The vent cap can be easily rotated 90° counterclockwise by the user to remove the vent cap from the vent port for routine battery maintenance and inspections. The described bayonet attachment system has been used for decades and continues to be a common system of attachment for battery vent caps and watering systems on deep-cycle batteries.

Recently, a push-in style of cap has been introduced, particularly for caps which are part of battery watering systems. The push-in style of construction enables the cap to be pushed into place without substantial rotation. Accordingly, an installation of the cap is relatively easy compared to the prior quarter-turn method of installation. The push-in caps are being used on an assembly line by battery manufacturers and manufacturers of battery-powered equipment such as golf cart manufacturers, for example. The caps also enable faster installation of battery watering systems. After the caps are pushed into place, the caps can rotate 360 degrees within the vent port, which is helpful in aligning connection ports on the caps with watering system tubing.

The push-in caps are tightly fitted into the vent port to improve a seal therebetween and prevent the cap from dislodging as the battery cover flexes during use. The tight fit also assists in maintaining an appropriate seal over a wide range of temperatures and vibrations experienced by the battery. The push-in caps, however, are not without problems. For example, to remove the push-in caps from the vent ports for routine battery maintenance, field personnel use screwdrivers or channel-lock wrenches to pry out or pull out the caps, potentially damaging the battery cover and/or the caps. It also can be hazardous because it involves the use of a metal tool on the battery cover, which can cause dangerous sparks that can trigger explosions. Accordingly, the benefits provided by the prior art push-in caps are offset by the difficult, potentially damaging, and hazardous removal of the caps for routine battery maintenance.

It is an object of the present invention to produce a battery cover assembly including a vent cap gang which is easily installed and removed.

SUMMARY OF THE INVENTION

In concordance and agreement with the present invention, a battery cover assembly including a vent cap gang which is easily installed and removed, has surprisingly been discovered.

In one embodiment, a battery vent cap gang, comprises: a plurality of vent caps, each of the vent caps including a first pin located at an axial center thereof and a second pin offset from the axial center; a first member operably coupled to the first pin of each of the vent caps; a second member operably coupled to the second pin of each of the vent caps; and an actuator operably coupled to at least one of the first member and the second member to cause substantially simultaneous rotational movement of the vent caps.

In another embodiment, a battery vent cap gang, comprises: a plurality of vent caps operably coupled to at least one member, wherein at least one of the vent caps is configured to facilitate an installation thereof into a battery cover without rotational movement thereof and a removal thereof from the battery cover with rotational movement thereof.

In yet another embodiment, a battery vent cap gang, comprises: a plurality of vent caps, each of the vent caps including a first pin located at an axial center thereof, a second pin offset from the axial center, and a plurality of radially outwardly extending tabs formed thereon wherein at least one of the vent caps is configured to facilitate an installation thereof into a battery cover without rotational movement thereof; a first member operably coupled to the first pin of each of the vent caps; a second member operably coupled to the second pin of each of the vent caps; and an actuator operably coupled to at least one of the first member and the second member to cause substantially simultaneous rotational movement of the vent caps.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which:

FIG. 5 is a fragmentary top perspective view of a battery cover assembly including a removed vent cap gang, wherein the vent cap gang has four vent caps and each vent cap includes a pair of diametrically opposed bayonet tabs having an inclined upper surface and an inclined lower surface;

FIG. 6 is a front elevational view of the vent cap gang illustrated in FIG. 5;

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
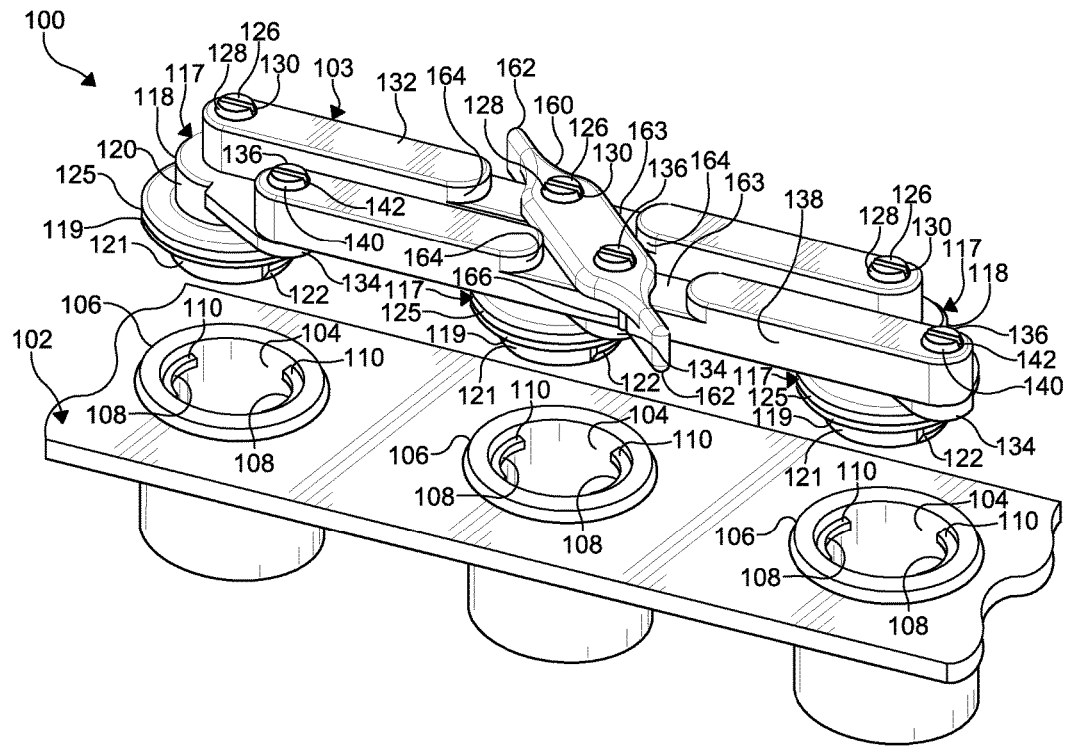
FIG. 1 is a fragmentary top perspective view of a battery cover assembly including a removed vent cap gang according to an embodiment of the present invention, wherein the vent cap gang has three vent caps and each vent cap includes a pair of diametrically opposed bayonet tabs having an inclined upper surface and an inclined lower surface.
Figure 2:
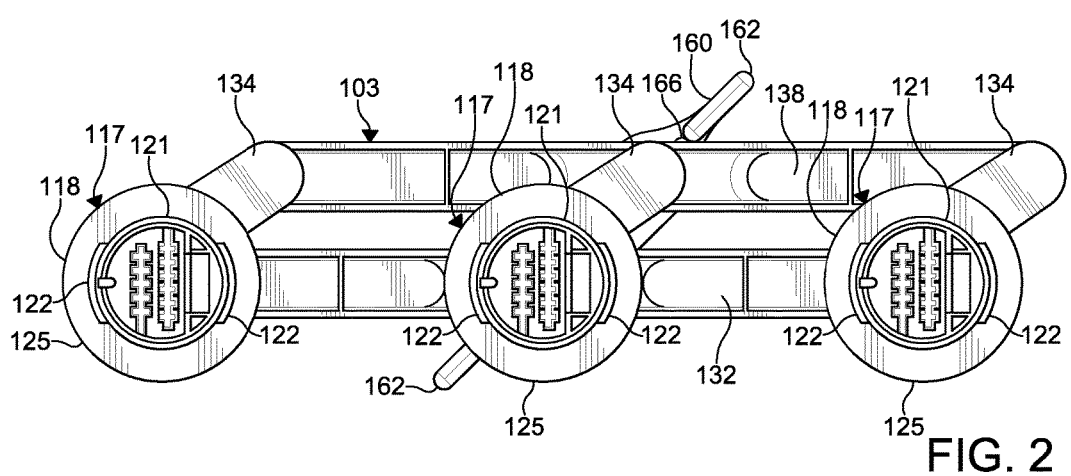
FIG. 2 is a bottom plan view of the vent cap gang illustrated in FIG. 1.
Figure 3:
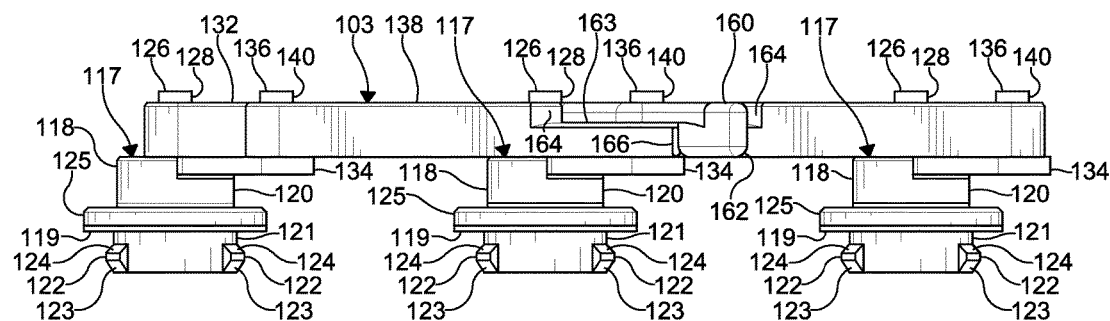
FIG. 3 is a front elevational view of the vent cap gang illustrated in FIGS. 1-2.
Figures 5, 6:
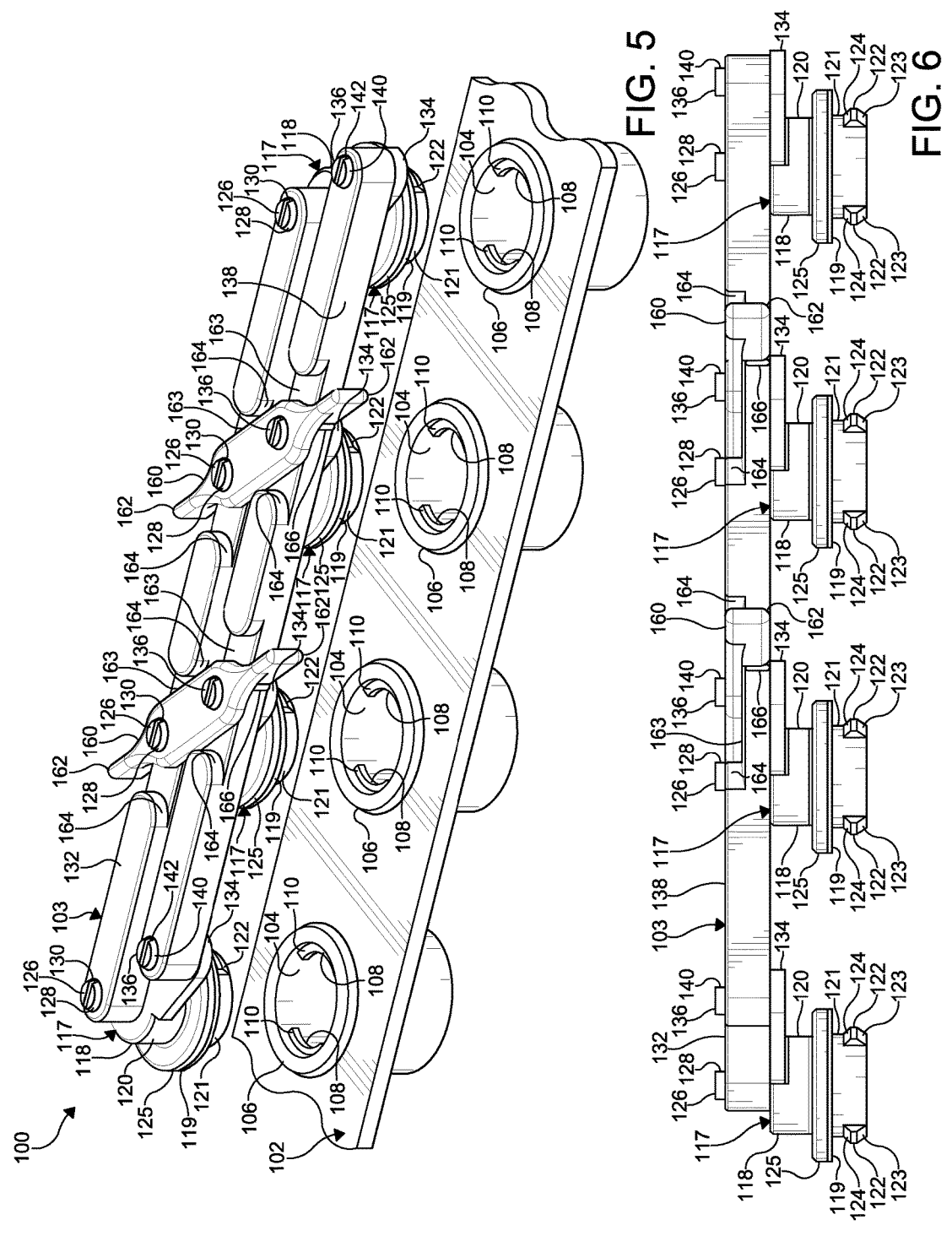

FIGS. 1 and 5 show a battery cover assembly 100 according to an embodiment of the present invention. The battery cover assembly 100 includes a battery cover 102 and a vent cap gang 103. It is understood that the battery cover 102 can be any suitable battery cover 102 as desired to form a substantially fluid-tight seal with a battery (not shown). The battery cover 102 includes a plurality of spaced apart vent ports 104 formed therein. The vent ports 104 can be formed in the battery cover 102 in any pattern or configuration as desired such as in a diagonal configuration or a linear configuration, for example. The vent ports 104 include a rim 106 and a pair of diametrically opposed, radially inwardly extending bayonet tabs 108. In a non-limiting example, each of the bayonet tabs 108 includes a substantially planer upper surface 110 and a substantially planar lower surface (not shown). The battery cover 102 may also include other features and components necessary for operation of the battery such as a pair of terminals (not shown) and a pair of mounting structures (not shown), for example.

Figure 4:
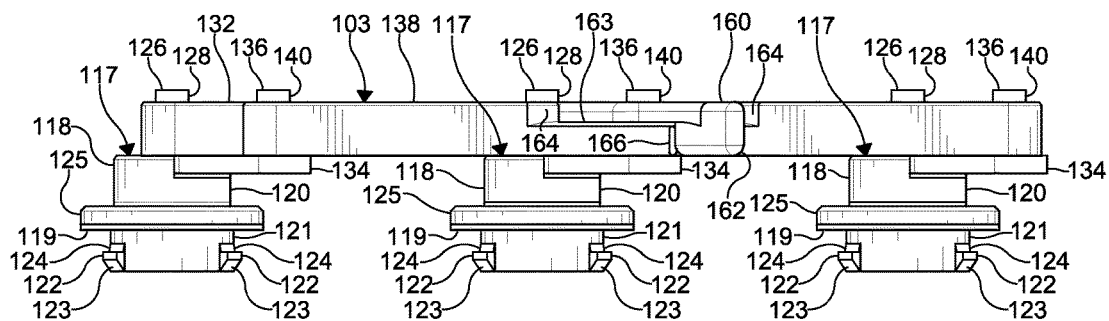
FIG. 4 is a front elevational view of a vent cap gang, wherein each vent cap of the vent cap gang includes a pair of diametrically opposed bayonet tabs having a substantially planar upper surface and an inclined lower surface.
Figure 7:
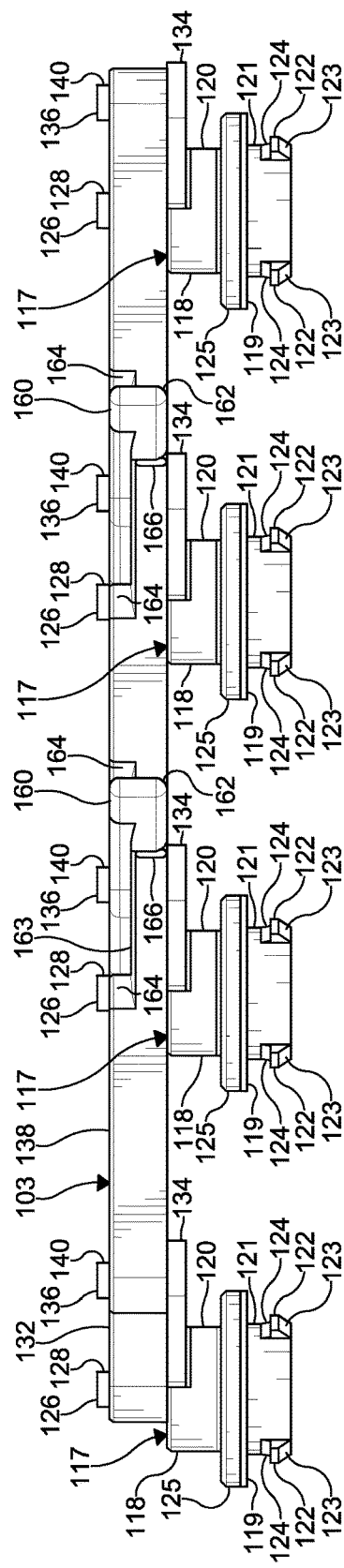
FIG. 7 is a front elevational view of a vent cap gang, wherein each vent cap of the vent cap gang includes a pair of diametrically opposed bayonet tabs having a substantially planar upper surface and an inclined lower surface.

As illustrated in FIGS. 1-7, the vent cap gang 103 includes a plurality of vent caps 117. It is understood that the vent cap gang 103 can include any number of vent caps 117 as desired such as three vent caps 117, as shown in FIGS. 1-4, or four vent caps 117, as shown in FIGS. 5-7, for example. Each of the vent caps 117 cooperates with the respective vent ports 104 formed in the battery cover 102. Each of the vent caps 117 includes a cylindrical body 118 and a sealing member 119. It is understood that the body 118 can be formed from any suitable material as desired such as a plastic material, for example. The body 118 includes an upper portion 120 and a lower portion 121. In a non-limiting example, the lower portion 121 of the vent cap 117 has a diameter slightly less than a diameter between bayonet tabs 108 of the vent ports 104. Each lower portion 121 has a pair of diametrically opposed, radially outwardly extending bayonet tabs 122. As shown in FIGS. 1, 3, and 5-6, the bayonet tabs 122 may be formed with an inclined lower surface 123 and an inclined upper surface 124 to facilitate movement of the bayonet tabs 122 past the bayonet tabs of the vent ports 104 during an installation and removal of the vent caps 117 therefrom. Alternatively, the bayonet tabs 122 may be formed with a substantially planar upper surface 124, as shown in FIGS. 4 and 7, to increase surface contact between the bayonet tabs 122 and the bayonet tabs 108 of the vent ports 104, and thereby improve retention of the vent caps 117 in the vent ports 104. Intermediate the upper portion 120 and the lower portion 121 of each body 118 is a radially outwardly extending flange 125. A lower surface of the flange 125 is in abutting contact with the sealing member 119 which encircles the lower portion 121.

Each upper portion 120 has a first pin 126 extending laterally outwardly from a center thereof. The first pins 126 operably couple the vent caps 117 to an elongate first member 132. Each of the first pins 126 includes a cylindrical section having an enlarged end 128. A slot 130, shown in FIGS. 1 and 5, is formed in each of the first pins 126 to form a first segment and a second segment. The slot 130 permits the segments to flex inwardly towards one another, thereby allowing the enlarged end 128 of the first pins 126 to be inserted into a respective aperture (not shown) formed in the first member 132. A diameter of each of the apertures of the first member 132 is slightly smaller than a diameter of each of the enlarged ends 128 of the first pins 126.

Each upper portion 120 also includes a radially outwardly extending arm 134 having a second pin 136 extending laterally outwardly from a distal end thereof. As shown, the second pin 136 is offset in respect of a center of the body 118 of the vent cap 117. The second pins 136 operably couple the vent caps 117 to an elongate second member 138. The second member 138 is substantially parallel to and laterally offset from the first member 132 prior to and after an installation of the vent cap gang 103 into the battery cover 102. Each of the second pins 136 includes a cylindrical section having an enlarged end 140. A slot 142, shown in FIGS. 1 and 5, is formed in each of the second pins 136 to form a first segment and a second segment. The slot 142 permits the segments to flex inwardly towards one another, thereby allowing the enlarged end 140 of the second pins 136 to be inserted into a respective aperture (not shown) formed in the second member 138. A diameter of each of the apertures of the second member 138 is slightly smaller than a diameter of each of the enlarged ends 140 of the second pins 136.

As illustrated, at least one of the vent caps 117 is also operably coupled to at least one actuator 160 by the pins 126, 136. The actuator 160 shown includes axially opposed grips 162. In a non-limiting example, the actuator 160 is received in an indentation 163 formed in each of the members 132, 138. Shoulder portions 164 of the members 132, 138 defining the indentations 163 perform as end stops during a pivoting of the actuator 160. It is understood that the vent cap gang 103 may further include at least one locking feature 166 such as a protuberance, a detent, or the like, for example, which maintains a position of the vent cap gang 103 prior to the installation thereof into the battery cover 102.

When installation of the vent cap gang 103 within the battery cover 102 is desired, the vent caps 117 of the vent cap gang 103 are aligned with the vent ports 104 of the battery cover 102. More particularly, the bayonet tabs 122 of each of the vent caps 117 are aligned with the respective bayonet tabs 108 of each of the vent ports 104. In certain embodiments, the locking feature 166 militates against an undesired movement of the actuator 160, the members 132, 138, and hence, the vent caps 117 after an assembly of the vent cap gang 103. Accordingly, the bayonet tabs 122 of each of the vent caps 117 are aligned with the respective bayonet tabs 108 of each of the vent ports 104 without requiring additional adjustment by field personnel.

The lower portion 121 of each body 118 of the vent caps 117 is substantially simultaneously urged downward into the vent ports 104 by the members 132, 138 without rotational movement thereof. As the body 118 of each of the vent caps 117 is inserted into the vent ports 104, the bayonet tabs 122 of the vent caps 117 slidingly contact the bayonet tabs 108 of the vent ports 104. In a non-limiting example, the inclined lower surface 123 of the bayonet tabs 122 enables the bayonet tabs 122 to pass beyond the bayonet tabs 108 of the vent ports 104. The vent cap gang 103 is urged downward until the upper surface 124 of the bayonet tabs 122 is located under the lower surface of the bayonet tabs 108 to secure the vent cap gang 103 in the battery cover 102 without rotational movement thereof. When the vent cap gang 103 is secured and in an engaged position, each sealing member 119 is compressed between the flange 125 of the vent cap 117 and the rim 106 of the vent port 104 to form a substantially fluid-tight seal.

When removal of the vent cap gang 103 from the vent ports 104 is desired such as for battery maintenance or service, for example, the vent cap gang 103 is disengaged from the vent ports 104. More particularly, a force is applied to the grips 162 of the actuator 160, causing a pivotal movement thereof. In certain embodiments, the force applied to the grips 162 of the actuator 160 is such that as to overcome a resistance force of the locking feature 166. The pivotal movement of the actuator 160 causes a lateral movement of the member 138, which in turn causes substantially simultaneous rotational movement of the vent caps 117. As a non-limiting example, the vent caps 117 are rotated up to about 90 degrees in a clockwise direction. It is understood, however, that the vent cap gang 103 can be configured such that the pivotal movement of the actuator 160 causes the vent caps 117 to rotate in a counter-clockwise direction. As the vent caps 117 rotate, the bayonet tabs 122 of the vent caps 117 slidingly contact, and ultimately disengage, the bayonet tabs 108 of the vent ports 104. In a non-limiting example, the inclined upper surface 124 of the bayonet tabs 122 enables the bayonet tabs 122 to pass beyond the bayonet tabs 108 of the vent ports 104 and release. Once the bayonet tabs 122 are released, the vent cap gang 103 is removed from the vent ports 104 by an axial movement thereof.

Figure 8:
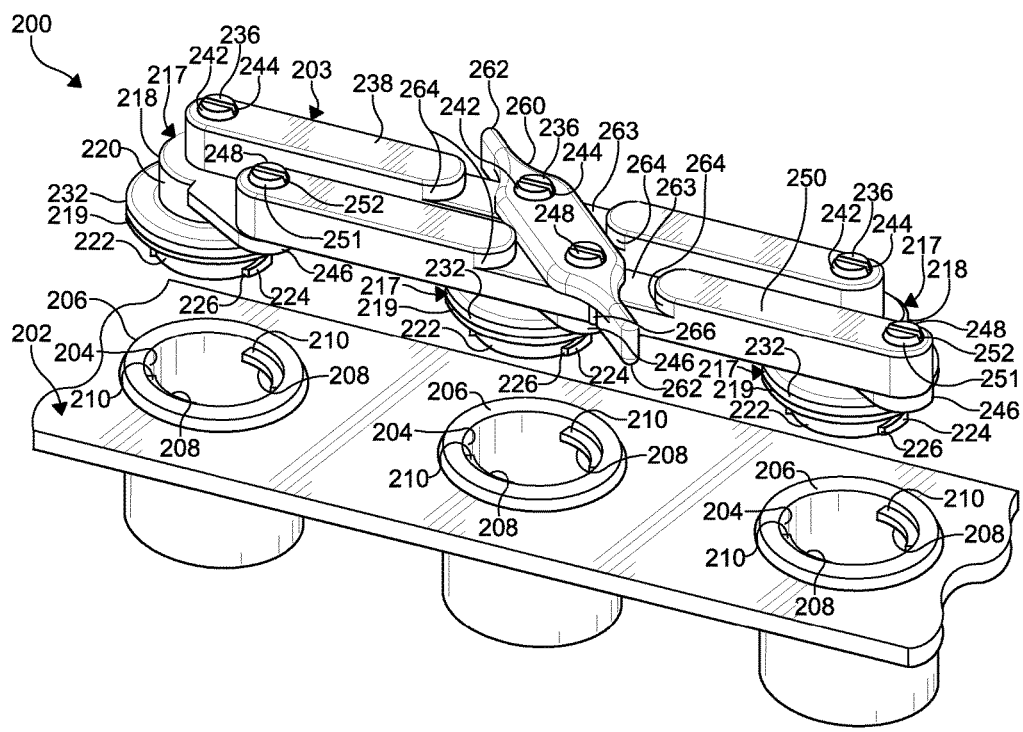
FIG. 8 a fragmentary top perspective view of a battery cover assembly including a removed vent cap gang according to another embodiment of the present invention, wherein the vent cap gang has three vent caps and each vent cap includes a pair of diametrically opposed ramp portions, each of which terminates in a stop.

FIG. 8 shows a battery cover assembly 200 according to an embodiment of the present invention. The battery cover assembly 200 includes a battery cover 202 and a vent cap gang 203. It is understood that the battery cover 202 can be any suitable battery cover 202 as desired to form a substantially fluid-tight seal with a battery (not shown). The battery cover 202 includes a plurality of spaced apart vent ports 204 formed therein. The vent ports 204 can be formed in the battery cover 202 in any pattern or configuration as desired such as in a diagonal configuration or a linear configuration, for example. The vent ports 204 include a rim 206 and a pair of diametrically opposed, radially inwardly extending bayonet tabs 208. In a non-limiting example, each of the bayonet tabs 208 includes a substantially planer upper surface 210 and a substantially planar lower surface (not shown). The battery cover 202 may also include other features and components necessary for operation of the battery such as a pair of terminals (not shown) and a pair of mounting structures (not shown), for example.

Figure 9:
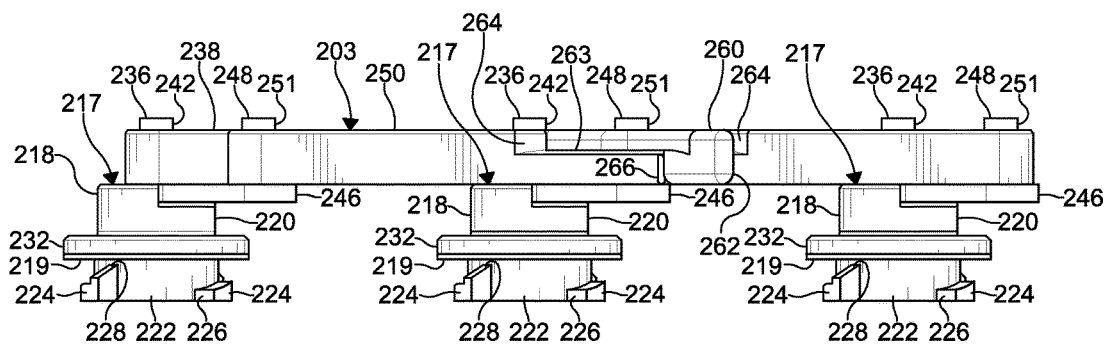
FIG. 9 is a front elevational view of the vent cap gang illustrated in FIG. 8.
Figure 10:
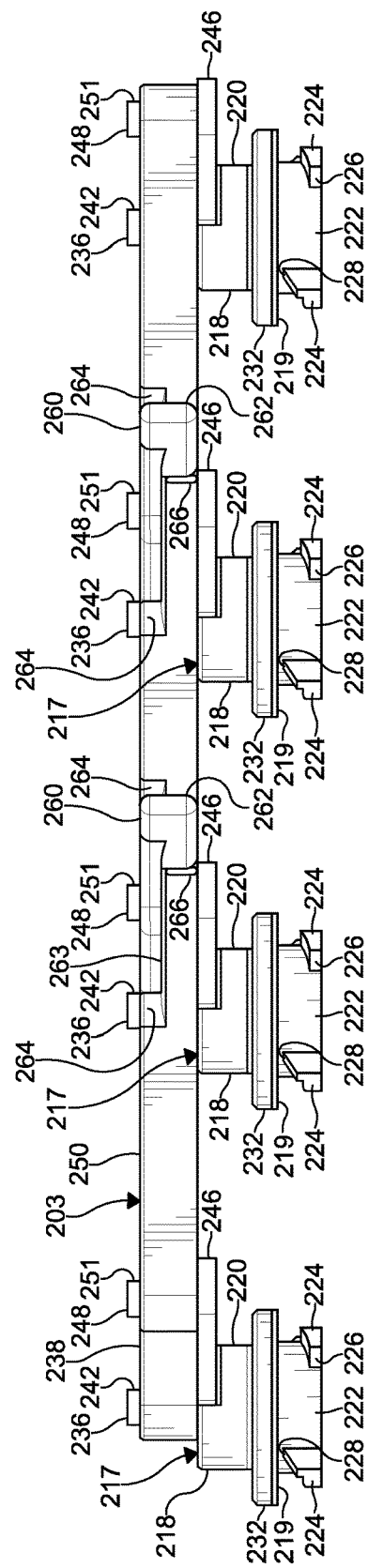
FIG. 10 is a front elevational view of a battery cover assembly including a vent cap gang, wherein the vent cap gang has four vent caps.

As illustrated in FIGS. 8-10, the vent cap gang 203 includes a plurality of vent caps 217. It is understood that the vent cap gang 203 can include any number of vent caps 217 as desired such as three vent caps 217, as shown in FIGS. 8-9, or four vent caps 217, as shown in FIG. 10, for example. Each of the vent caps 217 cooperates with the respective vent ports 204 formed in the battery cover 202. Each of the vent caps 217 includes a cylindrical body 218 and a sealing member 219. It is understood that the body 218 can be formed from any suitable material as desired such as a plastic material, for example.

The body 218 includes an upper portion 220 and a lower portion 222. In a non-limiting example, the lower portion 222 of the vent cap 217 has a diameter slightly less than a diameter between the tabs 208 of the vent ports 204. Each lower portion 222 has a pair of diametrically opposed, radially outwardly extending tabs 224. It is understood that the tabs 224 of the vent caps 217 could be formed on the vent port 204 and the tabs 208 of the vent ports 204 could be formed on the body 218 of the vent caps 217 if desired. The tabs 224 increase in axial thickness from a bottom end 226, shown in FIGS. 8-10, toward a top end 228, shown in FIGS. 9-10, in a counter-clockwise direction, forming a ramp portion which terminates in a stop. Each tab 224 extends about the body 218 approximately 90 degrees. It is understood that the tabs 224 can extend about the body 218 as desired. Intermediate the upper portion 220 and the lower portion 222 of each body 218 is a radially outwardly extending flange 232. A lower surface of the flange 232 is in abutting contact with the sealing member 219 which encircles the lower portion 222.

Each upper portion 220 has a first pin 236 extending laterally outwardly from a center thereof. The first pins 236 operably couple the vent caps 217 to an elongate first member 238. Each of the first pins 236 includes a cylindrical section having an enlarged end 242. A slot 244, shown in FIG. 8, is formed in each of the first pins 236 to form a first segment and a second segment. The slot 244 permits the segments to flex inwardly towards one another, thereby allowing the enlarged end 242 of the first pins 236 to be inserted into a respective aperture (not shown) formed in the first member 238. A diameter of each of the apertures of the first member 238 is slightly smaller than a diameter of each of the enlarged ends 242 of the first pins 236.

Each upper portion 220 also includes a radially outwardly extending arm 246 having a second pin 248 extending laterally outwardly from a distal end thereof. As shown, the second pin 248 is offset in respect of a center of the body 218 of the vent cap 217. The second pins 248 operably couple the vent caps 217 to an elongate second member 250. The second member 250 is substantially parallel to and laterally offset from the first member 238 prior to an installation of the vent cap gang 203 into the battery cover. Each of the second pins 248 includes a cylindrical section having an enlarged end 251. A slot 252, shown in FIG. 8, is formed in each of the second pins 248 to form a first segment and a second segment. The slot 252 permits the segments to flex inwardly towards one another, thereby allowing the enlarged end 251 of the second pins 248 to be inserted into a respective aperture (not shown) formed in the second member 250. A diameter of each of the apertures of the second member 250 is slightly smaller than a diameter of each of the enlarged ends 251 of the second pins 248.

As illustrated, at least one of the vent caps 217 is also operably coupled to at least one actuator 260 by the pins 236, 248. The actuator 260 shown includes axially opposed grips 262. In a non-limiting example, the actuator 260 is received in an indentation 263 formed in each of the members 238, 250. Shoulder portions 264 of the members 238, 250 defining the indentations 263 perform as end stops during a pivoting of the actuator 260. It is understood that the vent cap gang 203 may further include at least one locking feature 266 such as a protuberance, a detent, or the like, for example, which maintains a position of the vent cap gang 203 prior to the installation thereof into the battery cover.

When installation of the vent cap gang 203 within the battery cover is desired, the vent caps 217 of the vent cap gang 203 are aligned with the vent ports 204 of the battery cover 202. More particularly, the tabs 224 of each of the vent caps 217 are offset from the bayonet tabs 208 of each of the vent ports 204. In certain embodiments, the locking feature 266 militates against an undesired movement of the actuator 260, the members 238, 250, and hence, the vent caps 217 after an assembly of the vent cap gang 203.

Accordingly, the tabs 224 of each of the vent caps 217 are offset from the bayonet tabs 208 of each of the vent ports 204 without requiring additional adjustment by field personnel.

The lower portion 222 of each body 218 of the vent caps 117 is substantially simultaneously urged downward into the vent ports 204 having the tabs 224 thereof disposed between the bayonet tabs 208 of the vent ports 204. Once the body 218 of each of the vent caps 217 is inserted into the vent ports 204, the bottom end 226 of the tabs 224 is located below the tabs of the vent ports 204. A force is then applied against the grips 262 of the actuator 260 to cause a pivotal movement thereof. In certain embodiments, the force applied to the grips 262 of the actuator 260 is such that as to overcome a resistance force of the locking feature 266. The pivotal movement of the actuator 260 causes a lateral movement of the member 250, which in turn causes substantially simultaneous rotational movement of the vent caps 217. As a non-limiting example, the vent caps 217 are rotated up to about 90 degrees in a clockwise direction. It is understood, however, that the vent cap gang 203 can be configured such that the pivotal movement of the actuator 260 causes the vent caps 217 to rotate in a counter-clockwise direction. The rotational movement of the vent caps 217 causes a substantially simultaneous rotational movement of the tabs 224 of the vent caps 217 and an engagement of the tabs 224 with the bayonet tabs 208 of the vent ports 204. As the tabs 224 of the vent caps 217 and the tabs 208 of the vent ports 204 are engaged, the vent cap gang 203 is secured in the battery cover 202. When the vent cap gang 203 is secured and in the engaged position, each sealing member 219 is compressed between the flange 232 of the vent cap 217 and the rim 206 of the vent ports 204 to form a substantially fluid-tight seal.

When removal of the vent cap gang 203 from the vent ports 204 is desired such as for battery maintenance or service, for example, the vent cap gang 203 is disengaged from the vent ports 204. More particularly, a force is applied against the grips 262 of the actuator 260 in a counter-clockwise or second direction, causing a pivotal movement of the actuator 260 and a substantially simultaneous rotational movement of the vent caps 217. As a non-limiting example, the vent caps 217 are rotated up to about 90 degrees in the counter-clockwise direction. It is understood, however, that the vent cap gang 203 can be configured such that the pivotal movement of the actuator 260 causes the vent caps 217 to rotate in the clockwise direction. The rotational movement of the vent caps 217 causes a substantially simultaneous rotational movement of the tabs 224 of the vent caps 217 and a disengagement of the tabs 224 with the bayonet tabs 208 of the vent ports 204. As the tabs 224 of the vent caps 217 and the tabs of the vent ports 204 are disengaged, the vent cap gang 203 is released from the battery cover 202. Once released, the vent cap gang 203 can be removed from the battery cover 202 by an axial movement thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A battery vent cap gang, comprising:
   a plurality of vent caps, each of the vent caps including a first pin located at an axial center thereof and a second pin offset from the axial center;
   a first member operably coupled to the first pin of each of the vent caps;
   a second member operably coupled to the second pin of each of the vent caps; and
   an actuator operably coupled to and extending between the first member and the second member to cause substantially simultaneous rotational movement of the vent caps, wherein the actuator pivotally rotates about the axial center of one of the vent caps to cause a lateral movement of the second member.

2. The battery vent cap gang of claim 1, wherein the vent caps are configured to facilitate an installation of the vent caps into a battery cover with up to about 90 degrees of rotational movement.

3. The battery vent cap gang of claim 1, wherein the vent caps are configured to facilitate an installation of the vent caps into a battery cover without rotational movement of the vent caps.

4. The battery vent cap gang of claim 1, wherein the vent caps are configured to facilitate a removal of the vent caps from a battery cover with up to about 90 degrees of rotational movement of the vent caps.

5. The battery vent cap gang of claim 1, wherein at least one of the vent caps includes at least one radially outwardly extending tab formed thereon.

6. The battery vent cap gang of claim 5, wherein the at least one tab increases in axial thickness from a first end toward a second end to form a ramp portion.

7. The battery vent cap gang of claim 5, wherein the at least one tab has a first surface formed at an incline with respect to the axial center of the at least one vent cap and a second surface formed at an incline with respect to the axial center of the at least one vent cap.

8. The battery vent cap gang of claim 5, wherein the at least one tab has a first surface formed at an incline with respect to the axial center of the at least one vent cap and a second surface formed substantially perpendicular to the axial center of the at least one vent cap.

9. The battery vent cap gang of claim 1, further comprising a locking feature to militate against a movement of the actuator.

10. A battery vent cap gang, comprising:
    a plurality of vent caps operably coupled to at least one member, each of the vent caps including a pin located at an axial center of each of the vent caps, wherein the vent caps are configured to facilitate an installation of the vent caps into a battery cover without rotational movement of the vent caps and a removal of the vent caps from the battery cover with rotational movement of the vent caps about the axial center of the vent caps.

11. The battery vent cap gang of claim 10, wherein the vent caps are configured to facilitate the removal of the vent caps from the battery cover with up to about 90 degrees of rotational movement of the vent caps.

12. The battery vent cap gang of claim 10, further comprising at least one actuator operably coupled the at least one member and at least one of the vent caps to cause substantially simultaneous rotational movement of the vent caps, wherein the actuator pivotally rotates about the axial center of one of the vent caps.

13. The battery vent cap gang of claim 12, further comprising a locking feature to militate against a movement of the actuator.

14. The battery vent cap gang of claim 10, wherein at least one of the vent caps includes at least one radially outwardly extending tab formed thereon.

15. The battery vent cap gang of claim 14, wherein the at least one tab has a first surface formed at an incline with respect to the axial center of the at least one vent cap and a second surface formed at an incline with respect to the axial center of the at least one vent cap.

16. The battery vent cap gang of claim 14, wherein the at least one tab has a first surface formed at an incline with respect to the axial center of the at least one vent cap and a second surface formed substantially perpendicular to the axial center of the at least one vent cap.

17. A battery vent cap gang, comprising:
a plurality of vent caps operably coupled to at least one member, each of the vent caps including a pin located at an axial center thereof, wherein the vent caps are configured to facilitate an installation of the vent caps into a battery cover without rotational movement of the vent caps and a removal of the vent caps from the battery cover with rotational movement of the vent caps about the axial center of the vent caps;
an actuator operably coupled to the at least one member by the first pin to cause substantially simultaneous rotational movement of the vent caps, wherein the actuator pivotally rotates about the pin; and
at least one radially outwardly extending tab formed on at least one of the vent caps.

18. The battery vent cap gang of claim 17, wherein the at least one tab has a first surface formed at an incline with respect to the axial center of the at least one of the vent caps and a substantially inclined second surface formed at an incline with respect to the axial center of the at least one of the vent caps.

19. The battery vent cap gang of claim 17, wherein the at least one tab has a first surface formed at an incline with respect to the axial center of the at least one of the vent caps and a second surface formed substantially perpendicular to the axial center of the at least one of the vent caps.

20. The battery vent cap gang of claim 17, wherein the vent caps are configured to facilitate a removal of the vent caps from the battery cover with up to about 90 degrees of rotational movement of the vent caps.

* * * * *